United States Patent
Ito et al.

[15] 3,695,377
[45] Oct. 3, 1972

[54] METHOD OF REMOTE CONTROL OF TRACTORS

[72] Inventors: Yoshiyuki Ito; Toru Aihara, both of Sagamihara-shi, Japan

[73] Assignee: Caterpillar Mitsubishi Ltd., Tokyo, Japan

[22] Filed: Sept. 14, 1970

[21] Appl. No.: 71,877

[52] U.S. Cl. ........................ 180/66 B, 191/12, 180/2
[51] Int. Cl. .............................................. B60k 33/00
[58] Field of Search..... 180/2, 66, 6.48, 77 R; 191/12

[56] References Cited

UNITED STATES PATENTS

| | | | |
|---|---|---|---|
| 1,124,460 | 1/1915 | Koesis et al. | 180/66 |
| 2,698,507 | 1/1955 | Siebring | 180/2 |
| 2,781,456 | 2/1957 | Buckeridge | 191/12 |
| 2,826,402 | 3/1958 | Alspaugh et al. | 180/2 |
| 2,833,360 | 5/1958 | Spanjer | 180/6.48 |
| 3,379,008 | 4/1968 | Manganaro | 180/66 |
| 3,398,806 | 8/1968 | Hendricks | 180/2 |

*Primary Examiner*—Kenneth H. Betts
*Attorney*—Fryer, Tjensvold, Feix, Phillips & Lempio

[57] ABSTRACT

A method of remote control of tractors and similar earthmoving vehicles having an engine driven air compressor thereon, utilizes an umbilical control cable connected between the vehicle and the stationary control station and winds and unwinds the control cable on the vehicle as the machine moves relative to the stationary control station so that electrical signals sent through the control cable can operate relays and electro-pneumatic valves on the vehicle to route pneumatic pressure to actuating devices connected to the various controls of the vehicle.

4 Claims, 4 Drawing Figures

METHOD OF REMOTE CONTROL OF TRACTORS

BACKGROUND OF THE INVENTION

This invention relates to a method of remote control of vehicles, such as dozers and loaders equipped with endless tracks as well as wheel-type tractors, such as wheel-loaders and wheel-dozers.

Remote control of earthmoving vehicles has been accomplished in the past by utilizing radio transmitters with radio receivers mounted on the vehicle to receive signals sent by the transmitters and to operate various control devices on the vehicle for operating the same. More recently laser light transmitters, with an appropriate laser receiver mounted on the vehicle, have been used in a similar manner to effect remote control of such earthmoving vehicles.

While the radio and laser control systems are useful, they tend to be expensive and have certain drawbacks in the rough earthworking environments where their fragile components are often unreliable. Further it is difficult to make them failsafe should the transmitter prove unreliable.

In the instant invention a simple reliable remote control is effected through an umbilical control cable extending between the vehicle and a stationary control station by automatically winding and unwinding the cable on the vehicle as it moves relative to the stationary control station.

By utilizing pneumatic pressure to operate control devices on the vehicles, small electrical signals may be used to operate relays and solenoid valves on the vehicles so only limited amounts of electrical power need be transmitted through the umbilical control cable, which is a distinct advantage of the instant method. However, it is recognized that control cables have been utilized in coalworking equipment and the like where the mode of operation is somewhat different than that described herein with regard to control of the cable.

Another object of the instant method is to provide an inexpensive method of remote operation of a vehicle where direct manual operation is risky or difficult for personnel involved.

This invention differs from various devices which are used on vehicles to control large valves remote from the operator station which are often referred to as "pilot operated systems" in that no operator is present on the vehicle. However, in the instant method, such pilot operated systems are utilized to operate the controls with great advantage.

SUMMARY OF THE INVENTION

A method of operating an earthmoving vehicle with an engine-driven air compressor from a remote stationary station for safety in mines, tunnels, etc., includes the steps of equipping the tractor with pneumatic actuating devices for manipulating its controls, connecting each actuating device with the air compressor, a reservoir, a pneumatic circuit an a control valve for operating the same, equipping the control valves with electrical solenoid operating devices, connecting the tractor to a stationary remote control station having a source of electrical power through an electrical cable, equipping the tractor with a reel to wind and unwind the cable and operating the electrical solenoid devices through the electrical cable by switches at the control station while automatically winding and unwinding the control cable on the vehicle as it moves relative to the control station to prevent interference between the vehicle's movement and the control cable.

BRIEF DESCRIPTION OF THE DRAWINGS

The invention will be more specifically described by one embodiment of the invention taken in conjunction with the accompanying drawings in which.

DESCRIPTION OF AN EMBODIMENT

Figure 1:
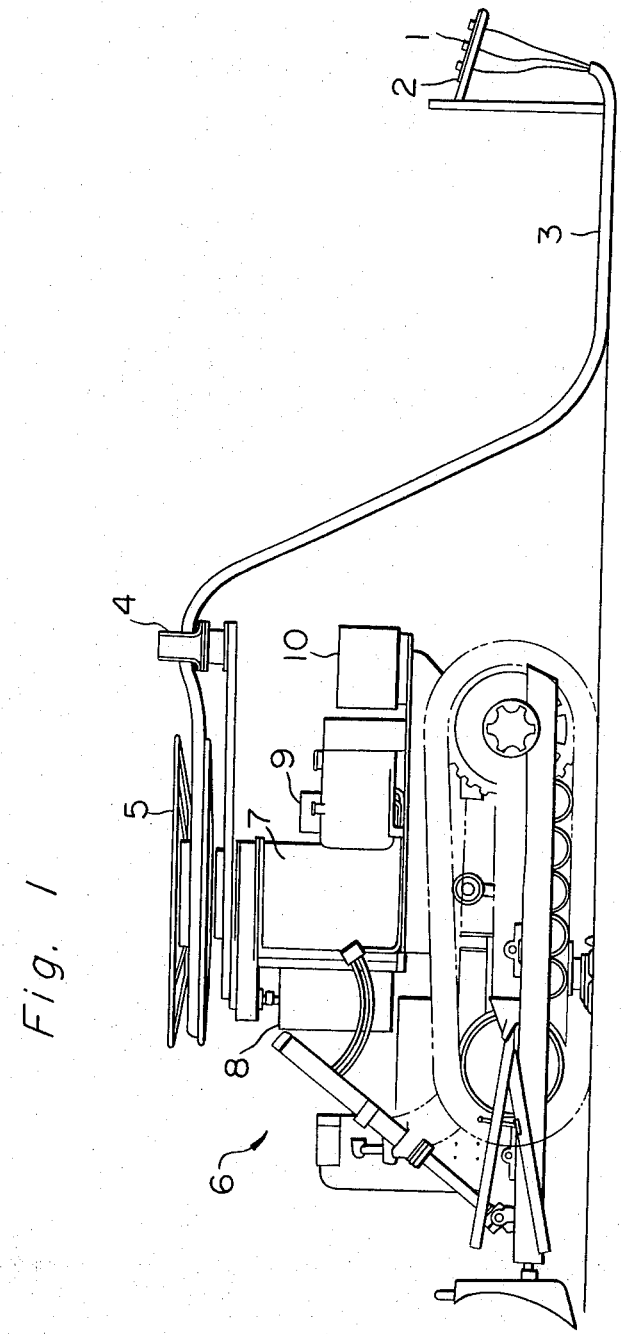
FIG. 1 is an elevation of the tractor equipped with the necessary reel and pneumatic components for carrying out the method of this invention.

FIG. 1 illustrates a tractor 6 equipped with the necessary components to be operated from a remote stationary control station 1 by the operation of a plurality of switches on its control panel 2. With eleven switches on the control panel a vehicle, such as the tractor, can be controlled in the forward, reverse and stop modes, together with the ability to turn right and left with several degrees of sharpness while simultaneously controlling an implement such as a blade by circuits raising and lowering it, along with establishing a float condition therefor.

By utilizing a plurality of electrical conduits 17 bundled in an umbilical control cable 3 connected between the tractor 6 and the stationary control station, remote control of the tractor can be accomplished through the switches.

Figure 2:
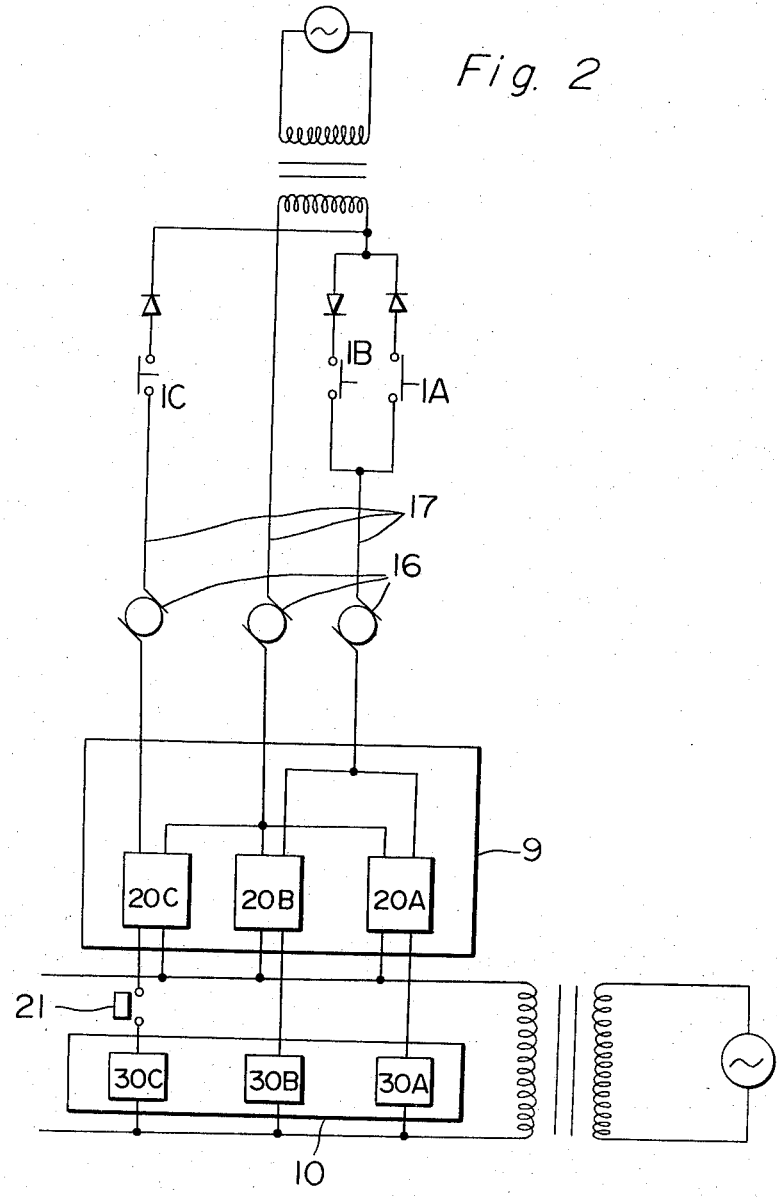
FIG. 2 is a schematic electrical circuit for the operating circuits of the equipment necessary to carry out the method of this invention.

In order to prevent injury and damage to the umbilical able 3, the end connected to the tractor 6 includes a suitable connector (not shown) that plugs into a reel 5 mounted on the tractor on which the cable winds and unwinds through a cable guide 4 as the tractor moves relative to the stationary control station. A number of slip rings 16, with associated brushes, best shown in FIG. 2, are provided on the rotating shaft of the reel so the conduits 17 may be connected to the associated circuits in the control device 9 on the vehicle. A cable winch 7 drives the reel through a torque motor 8 that supplies the energy for winding the cable on the reel.

As best shown in FIG. 2 the stationary control station 1 has a small alternating current power source. Through the use of a common connection of one side of this power source to the tractor, switches 1A and 1B can be connected in parallel to the opposite sided of the power source and a common electrical conduit 17 by using reversed diodes, so that two signals can be sent on the single conduit. In the control device 9, mounted on the tractor 6, a plurality of relays typified by relay 20A and 20B, are operated by their respective switches on the stationary control panel and include a diode matching the orientation of the diode of their associated control panel circuits so that only the appropriate relay will operate when its switch is actuated at the control panel. By utilizing electrical relays, only small electrical currents need be transmitted through the umbilical control cable keeping the size of this cable small, as well as limiting the amount of electrical power necessary at the stationary control station. Utilizing the relays heavy duty electrical circuits on the tractor can be utilized to operate associated solenoids, for example 30A and 30B of operating device 10.

Figure 3:
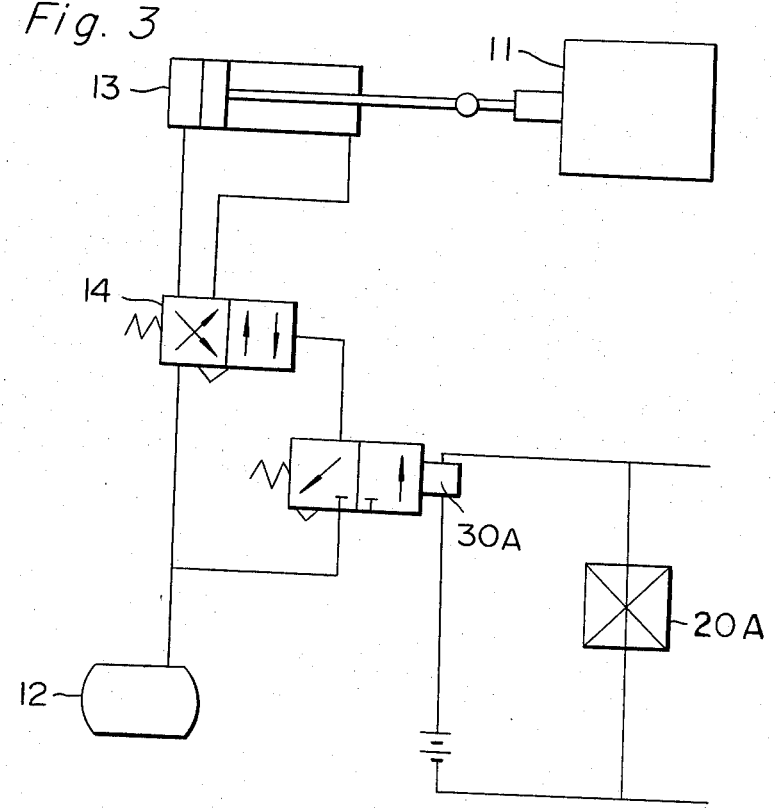
FIG. 3 is a combination of electrical and pneumatic circuits showing the operation of one of the controls of the vehicle, controlled by the method of this invention.

In FIG. 3 solenoid 30A is shown operating a pneumatic pilot valve and upon actuation of relay 20A the electrical circuit operates solenoid 30A which moves the pilot valve to vent pneumatic pressure from the air reservoir 12 to a master valve 14 also connected too the reservoir. The reservoir is connected to the air compressor to insure an adequate supply of air and in the normal or off condition of the master valve a spring moves its spool to connect the rod end of a pneumatic cylinder 13 to the reservoir causing a control of the tractor connected to the piston to be held in a predetermined position. When the pilot valve is operated through the actuation of switch 1A, the relay 20A will actuate the solenoid so that the pilot valve shifts the master valve so the pneumatic cylinder is pressurized at its piston end and thereby will shift control 11 to a new position. It can be appreciated that all eleven control switches utilized in this power boost arrangement, described above, are similar in that the opening of any switch will allow its associated master valve to return to the position shown in FIG. 3 and therefore reposition its attached control 11.

The torque motor 8 driving the reel 5 is energized by an electrical circuit on the tractor and connected, through the winch means, so that the torque on the reel is proportional to the r.p.m. thereof. The highest torque developed on the reel is provided at zero reel speed, as evidenced by the graph shown in FIG. 4. By adjusting the torque on the reel, which winds cable 3 thereon, it is possible to achieve a situation where the weight of the cable, extending angularly from guide 4, will cause the torque motor to stall. This condition is shown in FIG. 1. However, as the tractor moves toward the cable the torque on the reel will then be sufficient to wind the cable on the reel since some of the cable load is removed as the cable is approached by the vehicle and changes to a more vertical orientation. As a result there is no entanglement of the cable with the running gear of the tractor.

Illustrated in FIG. 2 is a circuit which includes a switch 1C on the control panel 2 which is connected through conduit 17 to a relay 20C on the tractor through appropriate slip ring 16. A solenoid 30C is connected to the relay 20C and the associated tractor circuit with a microswitch 21 connected in series therewith so that the relay will be unable to operate solenoid 30C with the microswitch open. In this circuit the control operated on the vehicle are its brakes which are normally in the on condition but which are released when switch 1C on the stationary control panel is activated with the microswitch closed. In turn the microswitch is connected mechanically with reel 5 and when the last loop of the cable, wound on the reel, is reached the microswitch opens whereby the brakes of the tractor are applied and an associated mechanical devices neutralizes the vehicle's transmission. When the reel stops, however, the microswitch is reengaged so a signal reversing the tractor can be utilized to move the tractor toward the control station. This is accomplished by connecting the microswitch to the torque motor so it will cause the circuit to be reconnected when the torque motor stops. As can be appreciated, as the tractor moves backwards or toward the stationary control panel the weight of the cable exerted against the torque motor decreases and therefore the torque motor will rotate the reel in the normal direction which winds the cable thereon.

Figure 4:
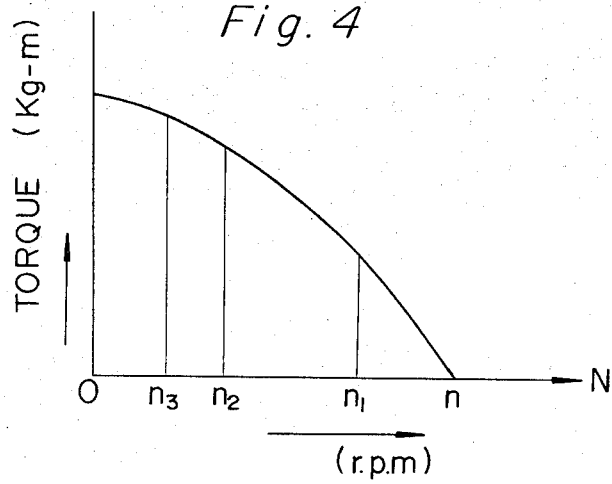
FIG. 4 is a graphic representation of a speed torque curve of the torque motor driving the cable winch which winds the umbilical control cable on a reel on the vehicle.

As shown in FIG. 4 there are speeds in $N_1$ and $N_2$ corresponding to the speed of the tractor. When the tractor moves backwards the cable load is reduced and thus the torque of the torque motor prevails and again the rotation of the motor in its normal direction begins driving the reel to wind the cable thereon. The shape of the reel used in the present embodiment is radial and the cable guide is provided so that it is freely rotatable relative to the reel so when the tractor turns sharply in either direction there is no accidental entanglement of the cable in the running gear of the tractor.

In summary, the present invention effects automatic operations of vehicles such as a tractor or wheel loader from remote locations in a vehicle utilizing an engine-driven air compressor, an air reservoir, pneumatic circuits and pneumatic actuating cylinder mechanisms connected to controls of the vehicle along with electrical operated relays and solenoids for operating the aforedescribed pneumatic circuits. The method of the instant invention utilizes an alternating current source at the stationary station so that multiple signal transmissions can be accomplished over a single conduit, reducing the size and bulk of the cable. Further it allows the reel for winding and unwinding the cable to be smaller and built more economically. It should be appreciated that when the tractor moves in the forward direction the load on the cable will be sufficient to rotate the stalled torque motor in the opposite direction to allow the cable to be unwound as the vehicle moves away from the stationary control station.

In the present invention most of the control operating devices are located on the vehicle or tractor with only the control station and its associated power supply located remote of the vehicle. The remote control, as indicated, is effected by operating switches while the tractor has its controls operated primarily by an engine driven air compressor, associated reservoir and pneumatic actuators coupled in the appropriate circuits, with valves. An important feature is the automatic application of the tractor's brakes through the opening of the microswitch when the umbilical control cable 3 is completely unwound from the reel to prevent it from being pulled free thereof.

According to the remote control method of this invention the pneumatic circuit provides the necessary energy for controlling the tractors controls and it is possible to effect control by transmission of only small amounts of electrical power over the control cable and thus it is possible to perform remote control very efficiently. The tractor can move freely in any desired direction without damage to the control cable and this facilitates construction and similar type works in mines, tunnels and in ships where danger to an operator exists.

We claim:

1. A method of remote control of an earthmoving vehicle from a stationary control unit having a source of electrical power connected thereto and an umbilical control cable connecting the control unit and the vehicle comprising:

equipping the vehicle with an engine driven air compressor, a pneumatic reservoir, pneumatic actuators for operating each of its controls and connecting pneumatic circuits having an electrical valve therein for each actuator, equipping the vehicle with a reel for said umbilical control cable and providing a drive therefor which can be overpowered by loads on said cable, and operating said vehicle by sending electrical signals from said control unit through said umbilical cable while simultaneously driving the reel with said drive to eliminate unnecessary cable between said control unit and said vehicle with said drive set to be overpowered by loads on the cable as said vehicle moves away from said control unit.

2. The method described in claim 1 wherein multiple signals are sent over a common lead in the control cable and the power source at the control unit is an A.C. power source.

3. The method defined in claim 2 wherein the electrical signals are generated by operating control switches at the stationary control unit.

4. The method described in claim 1 which includes the step of automatically stopping the vehicle as the end of the umbilical cable on the reel is approached by switch means provided for this purpose.

* * * * *